United States Patent
Savoyat et al.

(10) Patent No.: US 10,100,859 B2
(45) Date of Patent: Oct. 16, 2018

(54) RIVETED ASSEMBLY AND ASSOCIATED PRODUCTION METHOD

(71) Applicant: SAFRAN AIRCRAFT ENGINES, Paris (FR)

(72) Inventors: Pierre Savoyat, Moissy-cramayel (FR); Jean-Paul Bourgeois, Moissy-cramayel (FR); Bruno Dambrine, Moissy-cramayel (FR); François Marlin, Moissy-cramayel (FR); Dominique Raulin, Moissy-cramayel (FR); Régis Servant, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 29 days.

(21) Appl. No.: 15/303,924

(22) PCT Filed: Apr. 8, 2015

(86) PCT No.: PCT/FR2015/050911
§ 371 (c)(1),
(2) Date: Oct. 13, 2016

(87) PCT Pub. No.: WO2015/158983
PCT Pub. Date: Oct. 22, 2015

(65) Prior Publication Data
US 2017/0037887 A1    Feb. 9, 2017

(30) Foreign Application Priority Data

Apr. 14, 2014  (FR) ...................................... 14 53302

(51) Int. Cl.
*F16B 19/08*   (2006.01)
*F16B 5/04*    (2006.01)
(Continued)

(52) U.S. Cl.
CPC .................. *F16B 5/04* (2013.01); *F16B 5/01* (2013.01); *F16B 19/08* (2013.01); *F16B 19/1027* (2013.01)

(58) Field of Classification Search
CPC .... F16B 5/01; F16B 5/04; F16B 19/06; F16B 19/08; F16B 19/10; F16B 19/1027
(Continued)

(56) References Cited

U.S. PATENT DOCUMENTS 2,647,432 A  *  8/1953  Huck .................. F16B 19/1027
                                                      411/339
3,009,597 A  *  11/1961 Martin ................ E04F 13/0862
                                                      150/127
(Continued)

FOREIGN PATENT DOCUMENTS

FR    2256687 A5   7/1975
GB    767547 A     2/1957

OTHER PUBLICATIONS

International Search Report in corresponding International Application No. PCT/FR2015/050911 dated Jul. 3, 2015 (5 pages—English Translation included).

*Primary Examiner* — Roberta S Delisle
(74) *Attorney, Agent, or Firm* — Bookoff McAndrews, PLLC

(57) ABSTRACT

An assembly (110) comprising a core (113) and at least a first sheet (111) held on one side of the core by a rivet (120), the rivet having two ends (121, 122). At least a first one of these ends (121, 122) is flared in shape and extends at least through the entire thickness of the first sheet (111, 112). A method of fabricating such an assembly, in which: a core (113) and a first sheet (111) are provided; the first sheet (111) is placed on one side of the core (113); and the core (113) and the first sheet (111) are riveted together.

12 Claims, 2 Drawing Sheets

(51) Int. Cl.
*F16B 5/01* (2006.01)
*F16B 19/10* (2006.01)

(58) Field of Classification Search
USPC .......................................... 411/501, 503, 504
See application file for complete search history.

(56) References Cited

U.S. PATENT DOCUMENTS

| | | | | |
|---|---|---|---|---|
| 3,041,912 | A * | 7/1962 | Kreider | F16B 5/01 16/2.1 |
| 3,301,122 | A * | 1/1967 | Wagner | F16B 5/01 411/361 |
| 3,724,614 | A | 4/1973 | Bender | |
| 3,733,958 | A * | 5/1973 | Willey | F16B 19/04 29/509 |
| 3,842,479 | A * | 10/1974 | Willey | F16B 19/04 29/423 |
| 4,221,041 | A * | 9/1980 | Hufnagl | B21J 15/02 29/512 |
| 4,687,396 | A * | 8/1987 | Berecz | B29C 65/601 264/249 |
| 5,314,282 | A * | 5/1994 | Murphy | B29C 53/562 244/132 |
| 5,437,750 | A | 8/1995 | Rinse et al. | |
| 5,866,231 | A * | 2/1999 | Bodin | B64C 1/406 16/2.2 |
| 8,328,483 | B2 * | 12/2012 | Jones | F16B 19/1054 29/512 |
| 2013/0055549 | A1 * | 3/2013 | Auriol | B21J 15/02 29/525.07 |

* cited by examiner

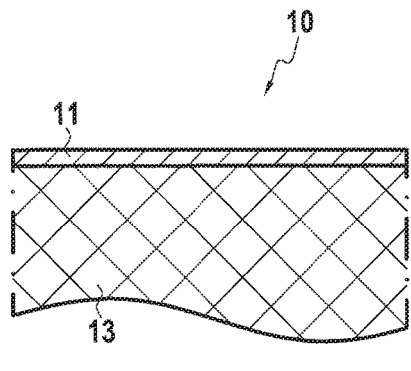
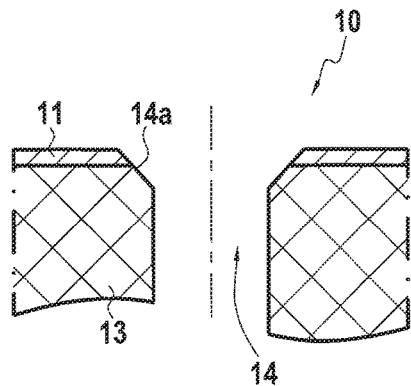
FIG.1A  FIG.1B
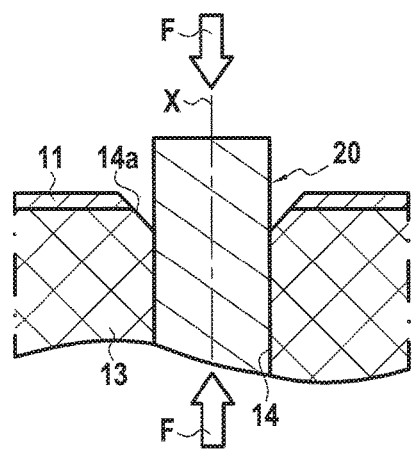
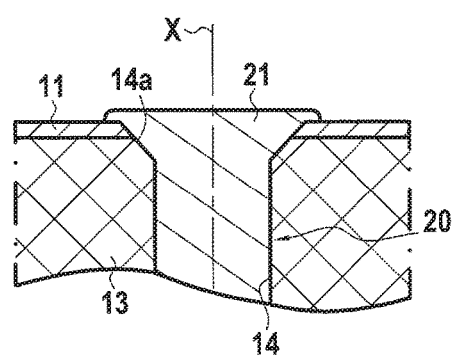
FIG.1C  FIG.1D
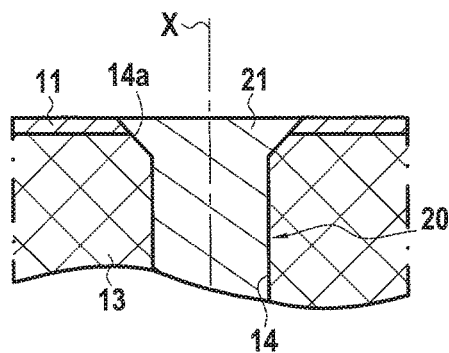
FIG.1E

RIVETED ASSEMBLY AND ASSOCIATED PRODUCTION METHOD

CROSS-REFERENCE TO RELATED APPLICATIONS

This application is the U.S. national phase entry under 35 U.S.C. § 371 of International Application No. PCT/FR2015/050911, filed on Apr. 8, 2015, which claims priority to French Patent Application No. 1453302, filed on Apr. 14, 2014.

FIELD OF THE INVENTION

The present description relates to a riveted assembly, and more particularly to an assembly comprising a core and at least one first sheet held on one side of the core by a rivet.

TECHNOLOGICAL BACKGROUND

Published patent application FR 2 256 687 describes a riveted assembly comprising a lightweight structure extending between two thin walls. The rivet possesses a frustoconical intermediate portion for coming into contact with the lightweight structure, and two cylindrical ends that are for coming into contact essentially with the thin walls. Each end is provided with an enlarged projecting abutment for holding the assembly made up of the lightweight structure and the two walls sandwiched together.

Nevertheless, the enlarged abutments of such a rivet are bulky in size and cannot be made smaller without compromising the mechanical characteristics of the rivet. There therefore exists a need for a novel type of riveted assembly.

SUMMARY OF THE INVENTION

To this end, the present description provides an assembly comprising a core and at least a first sheet that is held on one side of the core by a rivet, the rivet having two ends and at least a first one of these ends having a flared shape that extends through at least the entire thickness of the first sheet.

The core may be made up of material that is uniform or of material that is not uniform. The core may be made of one or more layers. The first sheet is of material that is generally thin in one direction in three-dimensional space compared with its dimensions in the other two (orthogonal) directions of three-dimensional space. The direction in which the sheet is thin is referred to as the "thickness" of the sheet. The first sheet may optionally be plane. The thickness of the first sheet may optionally be constant.

The rivet is generally inserted in the assembly substantially perpendicularly to the first sheet. A main axis of the rivet may extend substantially perpendicularly to the first sheet or substantially parallel to the thickness of the first sheet. Below, and unless mentioned to the contrary, the "axial", "radial", and "tangential" (or "circumferential") directions are defined relative to the main axis of the rivet.

A flared shape is a shape that becomes progressively larger. A flared shape is such that the outline of the shape departs progressively from an axis on advancing along the axis in one direction. The flared shape may be any shape so long as its complies with the above property. In a particular embodiment, the flared shape may be conical or the like. In variants, it may flare in concave or convex manner. When it flares in concave manner, the shape may have a hollow curved portion leaving a surrounding convex gap (or vice versa).

The flared shape may extend over all of the first end. In other words, the limit of the first end relative to the remainder of the rivet may be defined by the location where the rivet no longer flares.

The flared shape extends through at least the entire thickness of the first sheet. It may also extend along a portion of the core. It may also extend towards the outside of the assembly.

The rivet may be a conventional rivet, a blind rivet (also known as a "pop" rivet), or any other kind of rivet.

The walls of the first end in contact with the first sheet provide a bearing surface. Their flared shape through the entire thickness of the first sheet serves to increase the bearing surface area, thereby improving fastening and good strength of the assembly, and in particular providing good tear-out strength. Thus, by means of such an assembly, the shape of the first end fastens the sheet effectively against the core without it being necessary to provide a first end of large dimensions.

In certain embodiments, the assembly has a second sheet and the rivet fastens the second sheet to a side of the core opposite from the side of the first sheet. In such embodiments, the core is sandwiched between the first and second sheets.

In certain embodiments, the rivet has a second end of flared shape extending through at least the entire thickness of the second sheet. Thus, in such embodiments, the assembly comprises the core and the two sheets that are fastened to either side of the core by the rivet and its two ends, each end of the rivet having a flared shape that extends through at least the entire thickness of a corresponding one of the sheets.

In certain embodiments, the first and second sheets are two portions of a single hollow part in which the core is received. For example, the hollow part may be a part of U-shaped cross-section, such as an edge of a streamlined part, in particular an edge of a rotary or static streamlined part in a turbine engine.

In certain embodiments, one of the ends of the rivet includes a washer. The washer may be arranged at the periphery of the end, i.e. around an end circumference relative to the main axis of the rivet. The washer thus defines the (radially outer) peripheral cover of the end. Thus, when the end includes a washer, the washer is flared in shape and extends through at least the entire thickness of the sheet.

The washer is a part forming the interface between the rivet and the sheet. It serves to protect the sheet while the rivet is being installed and to accommodate variations in the shape of the rivet, e.g. associated with the rivet deforming while it is being put into place. The washer also serves to provide better distribution of the forces to which the end is subjected. The washer may be made out of the same material as the sheet with which it is in contact.

In certain embodiments, the washer has an inside shape that is conical with an angle at the apex lying in the range 60° to 120°, and that is preferably equal to 90°. The inside shape of the washer means its radially inner shape, i.e. the shape of the portion of the washer that is closest to the main axis of the rivet. This shape may correspond to the axially outer shape relative to the assembly, i.e. the shape of the portion of the washer that is furthest from the core.

The axis of the inner cone of the washer may be the main axis of the rivet. In a variant, or in addition, the axis of the inner cone of the washer may be perpendicular to the outside surface of the sheet with which the washer is in contact.

The inner cone of the washer is thus sufficiently open to prevent the washer from escaping and sufficiently closed to ensure that the end of the rivet does indeed fill the space left by the cone.

In certain embodiments, at least one of the ends of the rivet has a peripheral shape that is conical with an angle at the apex lying in the range 60° to 130°, preferably greater than 90°, preferably less than 120°, preferably substantially equal to 120°. The peripheral shape of the end designates the radially outer shape, i.e. the shape of the end portion that is furthest from the main axis of the rivet. This shape may correspond to the axially inner shape relative to the assembly, i.e. to the shape of the end portion that is closest to the core.

The axis of the peripheral end cone may be the main axis of the rivet. In a variant, or in addition, the axis of the peripheral end cone may be perpendicular to the outside surface of the sheet.

When the end includes a washer, these characteristics apply to the outside shape of the washer.

This range of angles is particularly advantageous for ensuring good transfer of forces to the assembly and for obtaining a large bearing surface area between the end and the sheet.

In certain embodiments, the outside surface of the first end is level with the outside surface of the first sheet. In certain embodiments, the first end is flush with the outside surface of the first sheet. The riveting seam thus does not disturb the aerodynamic characteristics of the assembly in any way.

The outside surface of the first sheet is the surface of the first sheet that is opposite from its surface in contact with the core. The outside surface of the first sheet is thus the surface of the first sheet that is furthest away from the core. The term "outside" should be understood herein relative to the axial direction of the rivet. Similarly, the outside surface of the first end is the surface of the first end that is furthest from the core. The outside surfaces of the first end and of the first sheet face the outside of the assembly.

In these embodiments, the outside surface of the first end and the outside surface of the first sheet are level in both directions along the axis, which means that the outside surface of the first end is neither proud nor set back relative to the outside surface of the first sheet. Thus, the first end constitutes neither an obstacle to the flow of fluid along the assembly, nor a zone that creates turbulence.

In certain embodiments, as an alternative or in addition, the outside surface of the second end is level with the outside surface of the second sheet.

In certain embodiments, the assembly includes a bushing placed around an intermediate portion of the rivet. The intermediate portion of the rivet is the portion situated between the ends of the rivet. By way of example, the intermediate portion may comprise a cylindrical portion (or drum). The bushing seeks to protect the assembly from radial forces that might act during riveting and/or during the lifetime of the assembly, as a function of the mechanical stresses to which it is subjected. The bushing also serves to have better control over swelling of the rivet and over its final state if the core is itself flexible, ductile, or indeed fragile. In certain embodiments, the bushing may be an independent part. In certain other embodiments, the bushing may be made integrally with the washer. In certain embodiments, the bushing may be placed between the intermediate portion of the rivet and the core.

In certain embodiments, the rivet is substantially a body of revolution around the main axis of the rivet and the height of at least one of the flared shapes is equal to about half a diameter of the intermediate portion. Height is measured along the main axis of the rivet, whereas diameters are measured perpendicularly to the main axis. By means of such a characteristic, the assembly is held together sufficiently by the rivet even when the rivet is severely stressed in traction.

In certain embodiments, the diameter of the intermediate portion is measured at the base of the first end. In other embodiments, the diameter of the intermediate portion is a mean diameter of the intermediate portion.

In certain embodiments, the ratio of a greatest diameter of the ends over the mean diameter of the intermediate portion lies in the range 1.5 to 2, preferably in the range 1.6 to 1.7, and is preferably equal to about 1.6. Such a characteristic improves the tear-out strength and the traction strength of the rivet.

The present description also provides a rotary or static part of a turbine engine, in particular a streamlined part, comprising an assembly as described above.

The present description also provides a method of fabricating an assembly as described above, the method comprising the following steps:
providing a core and a first sheet;
placing the first sheet on one side of the core; and
riveting together the core and the first sheet.

In certain implementations, prior to the riveting step, a second sheet is provided and placed on a side of the core opposite from the side of the first sheet. Thereafter, in the riveting step, the core is riveted to both sheets. The two sheets may be held to the core by rivets that are different, or by at least one rivet in common.

In certain implementations, between the placing step and the riveting step, at least one hole of flared shape is provided that extends at least through the entire thickness of the first sheet. A first flared hole is thus provided. The first end of the rivet may be shaped in such a manner as to co-operate in the riveting step with this first flared hole. The first flared hole may be a blind hole or a through hole.

In certain circumstances, there is no need to form a hole prior to the riveting step. Specifically, depending on the materials used for the core and the sheet(s), the penetration of the rivet into the assembly may be sufficient to format the assembly at least in part and to provide therein at least part of the rivet housing, and in particular the first flared hole. Under other circumstances, providing the first flared hole prior to upsetting the rivet serves to avoid excessively stressing the material constituting the core and the first sheet, and also to limit any risk of damaging the assembly.

In certain implementations, between the placing step and the riveting step, at least one second hole is provided having a flared shape that extends through at least the entire thickness of the second sheet. The second hole may be a blind hole or a through hole. Thus, the first and second flared holes may be provided in register with each other, one on each side of the assembly. These first and second holes may communicate via a space of arbitrary shape, and in particular of cylindrical shape. It is possible to provide the communication space initially and then to countersink the ends so as to give them flared shapes, or on the contrary to begin by creating two facing flared holes and subsequently to provide a space putting the two flared holes into communication with each other.

In certain implementations, the rivet has a first end that is flared (sometimes referred to as "head"), and in the riveting step, the end of the rivet opposite from the flared first end is flattened, thereby creating the flared shape of the second end.

In certain implementations, after the riveting step, the assembly is leveled so that the outside surface of the first flared end (or second flared end as the case may be) is level with the outside surface of the first sheet (or second sheet as the case may be).

In certain implementations, the method is performed cold, i.e. at a temperature of less than 120° C. The method thus does not include any heating step that might run the risk of damaging the sheets or the core, depending on the materials used. In particular, a core made of composite material is not damaged by such a cold method.

In certain implementations, in the placing step, the first sheet is fastened to the core, in particular by adhesive. Such a step reinforces the cohesion of the assembly and prevents the first sheet from moving relative to the core during riveting. In certain implementations, in the placing step, the second sheet is fastened to the core, in particular by adhesive.

In certain implementations, in the riveting step, a washer is interposed between the rivet and at least one of the sheets.

BRIEF DESCRIPTION OF THE DRAWINGS

The invention and its advantages can be better understood on reading the following detailed description of embodiments of the invention given as non-limiting examples. The description refers to the accompanying drawings, in which:

FIGS. 1A, 1B, 1C, 1D, and 1E are successive fragmentary section views showing how an assembly in a first embodiment of the invention is made;

DETAILED DESCRIPTION OF THE INVENTION

Figure 2:
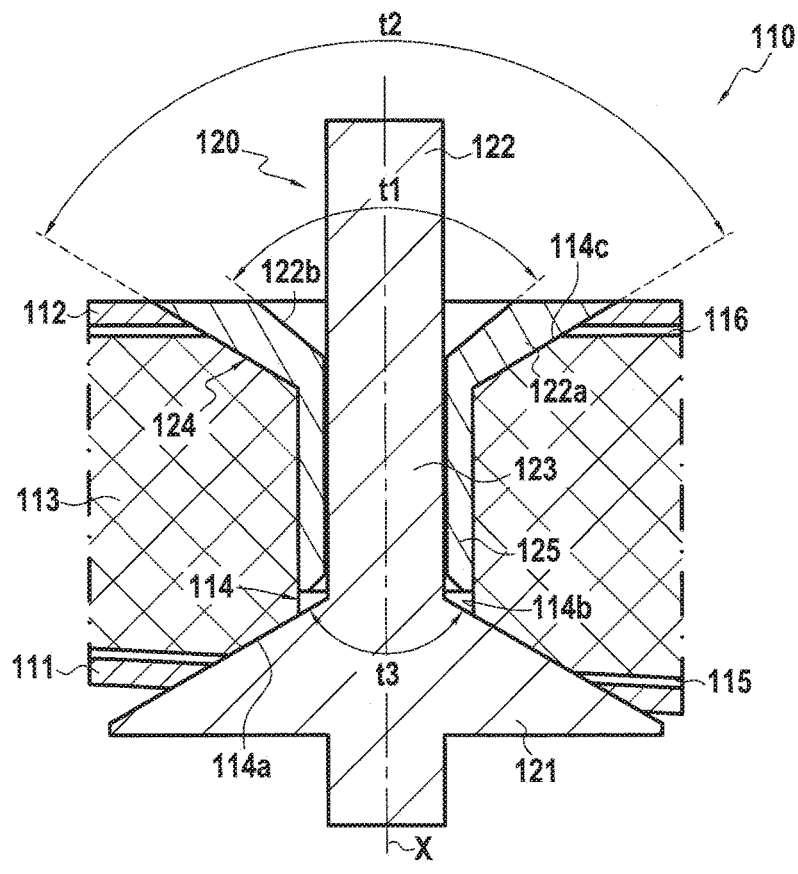
FIG. 2 is a section view of an assembly in a second embodiment of the invention while it is being made.

There follows a description of a method of making a riveted assembly 10 in a first embodiment of the invention, the description being given with reference to FIGS. 1A, 1B, 1C, 1D, and 1E.

As shown in FIG. 1A, there are provided a core 13 and a first sheet 11, and the first sheet 11 is placed on one side of the core 13. The first sheet 11 and the core 13 are directly one against the other. In this example, the core is uniform, but it could be a material that is not uniform or that is made up of a plurality of layers.

As shown in FIG. 1B, a hole 14 is made in the assembly 10 that is being prepared. The hole is specifically a through hole 14 of axis that is substantially perpendicular (i.e. perpendicular to within 10° or even to within 5°) relative to the outside surface of the first sheet 11. The hole may be cylindrical. For example, the hole may be a cylinder of revolution.

In the present embodiment, the hole 14 includes a flared portion 14a (or flared hole 14a). The flared portion 14a is a portion that is strictly flared, i.e. its section perpendicular to the flare axis is a function of abscissa position along the axis that is a strictly monotonic function, and in particular a strictly increasing function. The hole 14 as created in this way enables a rivet 20 to be inserted, as shown in FIG. 1C. The main axis X of the rivet coincides with the axis of the hole.

In other embodiments, when the first sheet is relatively flexible, it is possible to omit providing the flared hole 14a; the action of flattening the rivet sufficing on its own to deform the first sheet (and possibly a portion of the core) so that it matches the shape of the rivet, and in particular the shape of its first end.

Once the rivet 20 has been inserted in the assembly 10, it is possible to perform riveting proper, i.e. to deform the rivet 20 so as to prevent it being removed and so as to enable it to perform its fastener function. For example, it is possible to deform a first end 21 of the rivet using any technique known to the person skilled in the art, e.g. a technique similar to that described in above-mentioned patent application FR 2 256 687 and as symbolized in FIG. 1C by opposing forces F applied across the rivet 20. FIG. 1D shows the result of the deformation.

As can be seen in FIG. 1D, the first end 21 has been deformed by the forces F so as to occupy the space left by the flared hole 14a. The first end 21 is thus flared in shape. The flared shape flares relative to the main axis X. The diameter of the first end 21 perpendicular to the main axis X increases with increasing abscissa position along the main axis X. In addition, as can be seen in FIG. 1D, the flared shape of the first end 21 extends at least over the entire thickness of the first sheet 11. The flared shape of the first end 21 in this example is complementary to the shape of the flared hole 14a. In addition, because of the excess material provided on the rivet 20, the first end 21 projects beyond the first sheet 11.

After riveting, the first sheet 11 and the core 13 are sandwiched between the two ends of the rivet 20. In this way, the assembly 10 comprises the core 13 and the first sheet 11 that is fastened beside the core 13 by the rivet 20, the first end 21 of the rivet 20 having a flared shape that extends at least through the entire thickness of the first sheet 11.

The assembly 10 is then subjected to a machining step in order to remove any excess material of the first end 21. More precisely, the assembly is leveled at least at the first end 21 if it projects from the first sheet. The result that is obtained is shown in FIG. 1E. The outside surface of the first end 21 is level with the outside surface of the first sheet 11.

Figure 3:
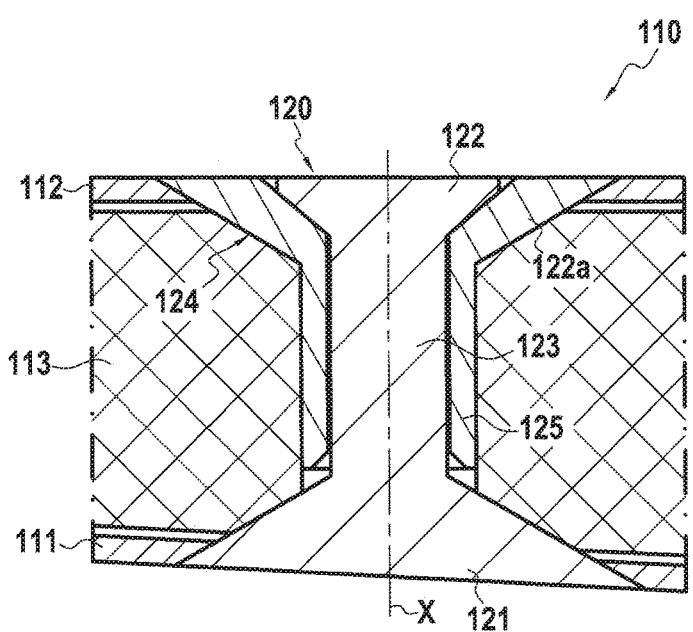
FIG. 3 is a section view of the FIG. 2 assembly, once it has been made.

FIGS. 2 to 3 show an assembly 110 in a second embodiment of the invention. FIG. 2 shows a core 113. The core 113 may be made of composite material, in particular fibers impregnated with resin, specifically a thermosetting resin. A first sheet 111 is fastened by a layer of adhesive 115 on one side of the core 113. On the side of the core 113 opposite from the first sheet 111, a second sheet 112 is fastened by a layer of adhesive 116. The first sheet 111 and/or the second sheet 112 may for example be metal foil. In particular, the first and/or second sheet 111, 112 may be made of titanium alloy, e.g. TA6V (European name Ti-6Al-4V, UNS standard R56400). In the present embodiment, the sheets have a thickness lying in the range 0.3 millimeters (mm) to 1.5 mm, and in particular greater than 0.5 mm, and less than 0.8 mm. In particular, the core 113 and the sheet(s) 111 and/or 112 may form a portion of a rotary or static streamlined part of a turbine engine.

In the assembly 110, a first hole 114a is formed that is flared in shape, extending at least through the entire thickness of the first sheet 111. A second hole 114c is also formed that is flared in shape and extending at least through the entire thickness of the second sheet 112. The two flared holes 114a and 114c communicate via a space 114b. In this example, the space 114b is substantially cylindrical in shape. Specifically, the first hole 114a is conical. The axis of the cone of the first hole 114a is the main axis X that is perpendicular to the second sheet 112. The second hole 114c is conical. The axis of the cone of the second hole 114c is the main axis X. Thus, in this embodiment, although the sheets 111 and 112 are not strictly parallel, the first and second flared holes 114a and 114b both flare relative to the same axis.

A rivet 120 is subsequently inserted through the first flared hole 114a, thereby obtaining the assembly 110 as shown in FIG. 2. Since it is to be deformed, the rivet 120 is advantageously made of a ductile material. In the present embodiment, the rivet 120 may be made of pure titanium, in particular of T40 (UNS standard R50400).

The rivet 120 has a first end 121 and a second end 122. The first end 121 is adapted to co-operate with the first hole 114a. The second end 122 is for co-operating with the second hole 114c.

The second end 122 of the rivet 120 has a washer 122a. In the present embodiment, the washer 122a is part of a sleeve 124 that will be described subsequently. The washer 122a is interposed between the rivet 120 and the second sheet 122. The washer 122a may be made of the same material as the second sheet 122 against which it rests, and in particular it may be made out of TA6V. In the example shown, the washer 122a presents a peripheral (radially outer) shape that is conical. The peripheral shape of the washer 122a matches the shape of the second flared hole 114c in which it is received. The peripheral shape of the washer 122a, which is to become the peripheral shape of the end 122, is a cone of revolution about the main axis X with an angle at the apex t2. The angle t2 lies in the range 60° to 130°. By way of example, the angle t2 may be about 120°.

Furthermore, in the example shown, the washer 122a has an inside (radially inner) shape 122b that is conical. The inside shape 122b of the washer 122a is to receive the material forming the second end 122 of the rivet after said second end 122 has been deformed. The inside shape of the washer 122a is a cone of revolution about the main axis X with an angle at the apex t1. The angle t1 lies in the range 60° to 120°. By way of example, the angle t1 is about 90°. Thus, in the example shown, the washer 122a is biconical about the main axis X.

As mentioned above, the washer 122a is formed from a portion of the sleeve 124. The sleeve 124 also has a bushing 125. The washer 122a and the bushing 125 in this example are two portions of a single part, however they could be made from two independent parts.

The bushing 125 is placed around an intermediate portion 123 of the rivet 120. The intermediate portion 123 is situated between the two ends 121 and 122 of the rivet 120. The bushing 125 may be placed between the core 113 and the rivet 120, and more precisely between the core 113 and the intermediate portion 123. The bushing 125 protects the core 113 from the radial forces that might be exerted by the rivet 120, and in particular by its intermediate portion 123. The bushing 125 guarantees the final shape of the intermediate portion 123 by limiting any radial expansion thereof.

By way of example, the first end 121 of the rivet is conical in shape. In this example, the cone is a cone about the main X with an angle at the apex t3. The angle t3 lies in the range 60° to 130°. In the example shown, the angle t3 is about 120°. Although the angles t2 and t3 in this example are equal, they could be different in other embodiments.

From the configuration shown in FIG. 2, riveting is performed by deforming the second end 122 of the rivet while holding the first end 121, using a method known to the person skilled in the art. The length and the diameter of the rivet 120 are determined by the person skilled in the art on the basis of that person's knowledge so as to ensure that it is sufficiently short not to buckle during riveting and sufficiently long to form a second end 122 of sufficient size, i.e. to fill the second flared hole 114c (taking account, where appropriate, of the inside shape 122b of the washer 122a) so as to come at least up to the level of the outside surface of the second sheet 112. By way of example, the diameter of the rivet 120 may lie in the range 2.4 mm to 3.6 mm for total thicknesses of the assembly 110 lying in the range a few millimeters to 11.5 mm.

After riveting, the assembly 110 is leveled so that the outside surface of the first end 121 is level with the outside surface of the first sheet 111. The assembly 110 is also leveled so that the outside surface of the second end 122 is level with the outside surface of the second sheet 112. An assembly 110 as shown in FIG. 3 is thus obtained. In certain embodiments, the first end of the rivet may be formed directly so that its outside surface is level with the outside surface of the first sheet 11, such that there is no need to rework its profile, e.g. by leveling. Conversely, in this second embodiment, the reworking of the profile that is performed enables the initial dimensions of the rivet 120 and its fit in the assembly 110 prior to deformation to satisfy constraints that are less strict.

As shown in FIG. 3, the assembly 110 has two sheets 111 and 112 that are held on either side of the core 113 by the rivet 120, each of the ends 121 and 122 of the rivet being flared in shape with the flare extending through at least the entire thickness of the corresponding one of the sheets. Thus, the riveting is additional to adhesive for fastening the assembly 110.

In the example shown, the flared shape of the ends project beyond the sheets 111 and 112. They may extend along a portion of the core 113.

As can be seen in FIG. 3, the intermediate portion 123 of the rivet has a diameter that is relatively small so as to avoid damaging the structure of the core 113. The tear-out strength of the assembly 110 is provided essentially by the flared shape of the ends 121 and 122, which extend at least through the entire thicknesses of the corresponding sheets 111 and 112. The flush nature of the outside surfaces of the first and second ends 121 and 122 is particularly advantageous for a part that is subjected to an air stream on either side of the riveted assembly 110.

When the core 113 is made of composite material, as in the second embodiment, swelling resulting from mechanical and/or thermal stresses on the material can cause the core 113 to expand in anisotropic manner. In particular, with resin-impregnated fibers, the fibers extend perpendicularly to the thickness of the core, so axial swelling (along the direction of the axis X) is about ten times greater than transverse swelling (perpendicular to the axis X); in addition, the transverse swelling of the fibers is about four times greater than the swelling of the metal rivet 120 in the same direction. As a result, the rivet 120 is subjected to axial traction at stresses that may exceed 100 megapascals (MPa). The flared shape proposed for the ends 121 and 122 of the rivet enables the forces to be taken up progressively by the structure and to be delivered for the most part against the sheets 111 and 112.

Although the present invention is described with reference to specific embodiments, modifications may be made thereto without going beyond the general ambit of the invention as defined by the claims. In particular, individual characteristics of the various embodiments shown and/or described may be combined in additional embodiments.

Consequently, the description and the drawings should be considered in a sense that is illustrative rather than restrictive.

The invention claimed is:

1. An assembly comprising a core, at least one first sheet held on one side of the core by a metallic rivet, and a second sheet held by the rivet on a side of the core opposite from the side of the first sheet, the rivet having two ends and at least a first one of these ends having a flared shape that extends at least through the entire thickness of the first sheet, a second of these ends having a flared shape that extends through at least the entire thickness of the second sheet, wherein the core includes a composite material, and the first sheet and the second sheet each includes a metallic material.

2. An assembly according to claim 1, further comprising a metallic washer that includes a flared shape, and a first end configured to receive the first end of the metallic rivet, wherein the flared shape of the washer extends through the entirety of the first sheet into the core.

3. An assembly according to claim 1, wherein the first end has an outside shape that is conical, with an angle at the apex lying in the range 60° to 130°.

4. An assembly according to claim 1, wherein the outside surface of the first end is level with the outside surface of the first sheet.

5. An assembly according to claim 1, including a bushing placed around an intermediate portion of the rivet, between the ends of the rivet.

6. A rotary or static part, optionally a streamlined part, of a turbine engine, the part comprising an assembly according to claim 1.

7. A fabrication method for fabricating an assembly according to claim 1, the method comprising the following steps:
   providing a core, a first sheet, and a second sheet;
   placing the first sheet on one side of the core;
   placing the second sheet on a side of the core opposite from the side of the first sheet; and
   riveting together the core, the first sheet, and the second sheet.

8. A fabrication method according to claim 7, wherein, between the placing the first sheet and the riveting step, at least one hole is provided of flared shape that extends at least through the entire thickness of the first sheet.

9. A fabrication method according to claim 7, wherein after the riveting step, the assembly is leveled so that the outside surface of the first end is level with the outside surface of the first sheet.

10. A fabrication method according to claim 7, wherein, in the placing step, the first sheet is fastened to the core, in particular by adhesive.

11. A fabrication method according to claim 7, wherein, in the riveting step, a washer is interposed between the rivet and the second sheet.

12. The method of claim 7, wherein an entirety of the method is performed at a temperature of less than 120° C.

* * * * *